United States Patent
Lou et al.

(10) Patent No.: US 10,887,931 B2
(45) Date of Patent: Jan. 5, 2021

(54) COMMUNICATION METHOD AND COMMUNICATIONS APPARATUS

(71) Applicant: HUAWEI TECHNOLOGIES CO., LTD., Guangdong (CN)

(72) Inventors: Chong Lou, Shanghai (CN); Mingzeng Dai, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,300

(22) Filed: Mar. 29, 2019

(65) Prior Publication Data
US 2019/0230725 A1    Jul. 25, 2019

Related U.S. Application Data

(63) Continuation of application No. PCT/CN2017/104418, filed on Sep. 29, 2017.

(30) Foreign Application Priority Data

Sep. 30, 2016  (CN) .......................... 2016 1 0878408

(51) Int. Cl.
| | |
|---|---|
| *H04L 5/00* | (2006.01) |
| *H04W 76/11* | (2018.01) |
| *H04W 68/00* | (2009.01) |
| *H04W 76/27* | (2018.01) |
| *H04W 76/25* | (2018.01) |
| *H04W 80/10* | (2009.01) |
| *H04W 84/00* | (2009.01) |

(52) U.S. Cl.
CPC .......... *H04W 76/11* (2018.02); *H04W 68/005* (2013.01); *H04W 76/25* (2018.02); *H04W 76/27* (2018.02); *H04W 80/10* (2013.01); *H04W 84/00* (2013.01)

(58) Field of Classification Search
CPC ....................................................... H04L 12/28
USPC ....................................................... 370/329
See application file for complete search history.

(56) References Cited

U.S. PATENT DOCUMENTS

| | | | |
|---|---|---|---|
| 2012/0275401 A1 | 11/2012 | Sun | |
| 2014/0071884 A1* | 3/2014 | Sherman | .......... H04W 72/0413 370/315 |

FOREIGN PATENT DOCUMENTS

| | | |
|---|---|---|
| CN | 105813195 A | 7/2016 |
| WO | 2009055414 A2 | 4/2009 |

OTHER PUBLICATIONS

Extended European Search Report issued in European Application No. 17854996.0 dated May 24, 2019, 7 pages.
(Continued)

*Primary Examiner* — Dang T Ton
(74) *Attorney, Agent, or Firm* — Fish & Richardson P.C.

(57) ABSTRACT

The present disclosure relates to communication methods and communications apparatus. One example method includes receiving a first message that is sent by a terminal through an access network device and that includes a first identifier, where the first identifier is used to indicate a message type of the first message, and the message type corresponds to a control plane entity type, and determining the control plane entity type to receive the first message based on the first identifier.

8 Claims, 9 Drawing Sheets

(56) References Cited

OTHER PUBLICATIONS

China Mobile et al, Network Slicing Architecture and High-Level Function Definition. SA WG2 Meeting #115, May 23-27, 2016, Nanjing, China, S2-162365, 7 pages.

Ericsson, Solution for selection of a network slice instance. SA WG2 Meeting #116, Jul. 11-15, 2016, Vienna, AT, S2-163978, 5 pages.

Huawei et al, Update of Solution 6.1.1: The required identities for network slice selection. 3GPP TSG SA WG2 Meeting #116 Bis, Aug. 29-Sep. 3, 2016, Sanya, P.R of China, S2-164524, 10 pages.

3GPP TR 23.799 V1.0.1 (Sep. 2016), 3rd Generation Partnership Project; Technical Specification Group Services and System Aspects; Study on Architecture for Next Generation System(Release 14), 423 pages.

3GPP TR 22.891 V14.1.0 (Jun. 2016), 3rd Generation Partnership Project; Technical Specification Group Services and System Aspects; Feasibility Study on New Services and Markets Technology Enablers; Stage 1(Release 14), 95 pages.

Ericsson, Solution for selection of a network slice instance. SA WG2 Meeting #114 Apr. 11-15, 2016, Sophia Antipolis, S2-161480, 4 pages.

Ericsson, Solution for selection of a network slice instance with initial bootstrap. SA WG2 Meeting #114 Apr. 11-15, 2016, Sophia Antipolis, France, S2-161481, 4 pages.

PCT International Search Report and Written Opinion in International Application No. dated Sep. 30, 2016, 18 pages (with English translation).

* cited by examiner

COMMUNICATION METHOD AND COMMUNICATIONS APPARATUS

CROSS-REFERENCE TO RELATED APPLICATIONS

This application is a continuation of International Application No. PCT/CN2017/104418, filed on Sep. 29, 2017, which claims priority to Chinese Patent Application No. 201610878408.8, filed on Sep. 30, 2016. The disclosures of the aforementioned applications are hereby incorporated by reference in their entireties.

TECHNICAL FIELD

This application relates to the field of communications technologies, and in particular, to a communication method and a communications apparatus.

BACKGROUND

A future fifth generation (5G) mobile communications network may support more diversified service types and user requirements, and great upgrade is to be achieved in aspects including a speed, a capacity, security, reliability, availability, a latency, energy consumption, and the like. Therefore, the 3rd Generation Partnership Project (3GPP) presents a concept of network slicing in a 5G network architecture. Network slicing is a combination of logical network functions that meet a communication service requirement in a particular use case. Network slicing helps, by using logical resources rather than physical resources, an operator to provide a service-based network architecture. In such a network service, a resource and a requirement are allocated and reallocated, and scalability of an independent network function module and flexible deployment of a physical function and a virtualized function are enabled, so that a service performance requirement is met while a network resource is fully and effectively utilized. There are two types of control plane network function (CP NF) entities in network slicing: a common control plane network function entity that can be shared by a plurality of network slices, such as a mobility management (MM) entity; and a private control plane network function entity that is specific to each network slice and cannot be shared with another network slice, such as a session management (SM) entity.

After network slicing is introduced, a plurality of network slices may coexist in a scenario. In other words, one terminal may access a plurality of network slices, and one access network device may be connected to a plurality of network slices. In this case, there is no clear solution for a device, such as a terminal or an access network device, to distinguish between control plane entity types that correspond to all messages.

SUMMARY

Embodiments of this application provide a communication method and a communications apparatus, so that a device such as a terminal or an access network device identifies and distinguishes a control plane entity type corresponding to each message.

An embodiment of this application provides a communication method, including:

receiving a first message that is sent by a terminal through an access network device and that includes a first identifier, where the first identifier is used to indicate a message type of the first message, and each message type corresponds to one control plane entity type; and determining a control plane entity type to receive first message based on the first identifier.

In the foregoing method, the control plane entity type to receive first message can be determined based on the first identifier in the received first message, so that a control plane entity type corresponding to each message can be identified and distinguished, thereby improving system efficiency.

Optionally, the first message further includes a second identifier, and the second identifier is used to indicate a network slice for which the first message is destined or a control plane entity for which the first message is destined; and the method further includes:

sending, based on the second identifier, the first message to the control plane entity in the network slice for which the first message is destined.

Optionally, the first message is an RRC message in which a non-access stratum protocol data unit NAS PDU is encapsulated; and both the first identifier and the second identifier are in the NAS PDU.

Optionally, the first message is an RRC message in which a NAS PDU is encapsulated; and both the first identifier and the second identifier are in the RRC message in which the NAS PDU is encapsulated.

An embodiment of this application provides a communication method, including:

generating, by a terminal, a first message including a first identifier, where the first identifier is used to indicate a message type of the first message, and each message type corresponds to one control plane entity type; and sending, by the terminal, the first message through an access network device.

In the foregoing method, the first identifier is carried in the first message sent by the terminal, so that a receiving party that receives the first message determines a control plane entity type to receive first message based on the first identifier, so that a control plane entity type corresponding to each message can be identified and distinguished, thereby improving system efficiency.

Optionally, the first message further includes a second identifier, and the second identifier is used to indicate a network slice for which the first message is destined or a control plane entity for which the first message is destined.

Optionally, the method further includes:

receiving, by the terminal, a second message that is sent by the access network device and that includes the first identifier; and determining, by the terminal based on the first identifier, a control plane entity type of the second message that is received by the terminal.

Optionally, the second message further includes a second identifier; and the method further includes:

sending, by the terminal based on the second identifier, the second message to a control plane entity that is of the terminal and that is in a network slice for which the second message is destined.

An embodiment of this application provides a communication method, including:

receiving, by a network device, a first message that is sent by a terminal and that includes a first identifier, where the first identifier is used to indicate a network slice for which the first message is destined; and sending, by the network device based on the first identifier, the first message to the network slice for which the first message is destined.

In the foregoing method, after receiving the first message sent by the terminal, the network device can determine, based on the first identifier, the network slice for which the received first message is destined, so that a network slice corresponding to each message can be identified and distinguished, thereby improving system efficiency.

Optionally, the first message further includes a second identifier, the second identifier is used to indicate a message type of the first message, and each message type corresponds to one control plane entity type.

Optionally, the method further includes:

generating, by the network device, a second message, where the second message includes one or more of the first identifier and the second identifier; and sending, by the network device, the second message to the terminal.

Optionally, the first message is an RRC message in which a non-access stratum protocol data unit NAS PDU is encapsulated; and the first identifier is in the RRC message, and the second identifier is in the NAS PDU.

Optionally, the first message is an RRC message in which a non-access stratum protocol data unit NAS PDU is encapsulated; and both the first identifier and the second identifier are in the RRC message.

An embodiment of this application provides a communication method, including:

generating, by a terminal, a first message including a first identifier, where the first identifier is used to indicate a network slice for which the first message is destined; and sending, by the terminal, the first message to a network device.

In the foregoing method, the first identifier is carried in the first message sent by the terminal, so that a receiving party that receives the first message determines, based on the first identifier, the network slice for which the received first message is destined, so that a network slice corresponding to each message can be identified and distinguished, thereby improving system efficiency.

Optionally, the first message further includes a second identifier, the second identifier is used to indicate a message type of the first message, and each message type corresponds to one control plane entity type.

Optionally, the method further includes:

receiving, by the terminal, a second message sent by the network device, where the second message includes one or more of the first identifier and the second identifier.

An embodiment of this application provides a communications apparatus, including:

a transceiver unit, configured to receive a first message that is sent by a terminal through an access network device and that includes a first identifier, where the first identifier is used to indicate a message type of the first message, and each message type corresponds to one control plane entity type; and a processing unit, configured to determine a control plane entity type to receive first message based on the first identifier.

Optionally, the first message further includes a second identifier, and the second identifier is used to indicate a network slice for which the first message is destined or a control plane entity for which the first message is destined; and the processing unit is further configured to:

send, based on the second identifier, the first message to the control plane entity in the network slice for which the first message is destined.

Optionally, the first message is an RRC message in which a non-access stratum protocol data unit NAS PDU is encapsulated; and both the first identifier and the second identifier are in the NAS PDU.

Optionally, the first message is an RRC message in which a NAS PDU is encapsulated; and both the first identifier and the second identifier are in the RRC message in which the NAS PDU is encapsulated.

An embodiment of this application provides a communications apparatus, including:

a processing unit, configured to generate a first message including a first identifier, where the first identifier is used to indicate a message type of the first message, and each message type corresponds to one control plane entity type; and a transceiver unit, configured to send the first message through an access network device.

Optionally, the first message further includes a second identifier, and the second identifier is used to indicate a network slice for which the first message is destined or a control plane entity for which the first message is destined.

Optionally, the transceiver unit is further configured to:

receive a second message that is sent by the access network device and that includes the first identifier; and the processing unit is further configured to determine, based on the first identifier, a control plane entity type of the second message that is received by the terminal.

Optionally, the second message further includes a second identifier; and the processing unit is further configured to:

send, based on the second identifier, the second message to a control plane entity that is of the terminal and that is in a network slice for which the second message is destined.

An embodiment of this application provides a communications apparatus, including:

a transceiver unit, configured to receive a first message that is sent by a terminal and that includes a first identifier, where the first identifier is used to indicate a network slice for which the first message is destined; and a processing unit, configured to send, based on the first identifier, the first message to the network slice for which the first message is destined.

Optionally, the first message further includes a second identifier, the second identifier is used to indicate a message type of the first message, and each message type corresponds to one control plane entity type.

Optionally, the processing unit is further configured to:

generate a second message, where the second message includes one or more of the first identifier and the second identifier; and the transceiver unit is further configured to send the second message to the terminal.

Optionally, the first message is an RRC message in which a non-access stratum protocol data unit NAS PDU is encapsulated; and the first identifier is in the RRC message, and the second identifier is in the NAS PDU.

Optionally, the first message is an RRC message in which a non-access stratum protocol data unit NAS PDU is encapsulated; and both the first identifier and the second identifier are in the RRC message.

An embodiment of this application provides a communications apparatus, including:

a processing unit, configured to generate a first message including a first identifier, where the first identifier is used to indicate a network slice for which the first message is destined; and a transceiver unit, configured to send the first message to a network device.

Optionally, the first message further includes a second identifier, the second identifier is used to indicate a message type of the first message, and each message type corresponds to one control plane entity type.

Optionally, the transceiver unit is further configured to:

receive a second message sent by the network device, where the second message includes one or more of the first identifier and the second identifier.

An embodiment of this application provides a communications apparatus, including:

a processor, configured to generate a first message including a first identifier, where the first identifier is used to indicate a message type of the first message, and each message type corresponds to one control plane entity type; and a transceiver, configured to send the first message through an access network device.

Optionally, the first message further includes a second identifier, and the second identifier is used to indicate a network slice for which the first message is destined or a control plane entity for which the first message is destined.

Optionally, the transceiver is further configured to:

receive a second message that is sent by the access network device and that includes the first identifier; and the processor is further configured to determine, based on the first identifier, a control plane entity type of the second message that is received by the terminal.

Optionally, the second message further includes a second identifier; and the processor is further configured to:

send, based on the second identifier, the second message to a control plane entity that is of the terminal and that is in a network slice for which the second message is destined.

An embodiment of this application provides a communications apparatus, including:

a transceiver, configured to receive a first message that is sent by a terminal and that includes a first identifier, where the first identifier is used to indicate a network slice for which the first message is destined; and a processor, configured to send, based on the first identifier, the first message to the network slice for which the first message is destined.

Optionally, the first message further includes a second identifier, the second identifier is used to indicate a message type of the first message, and each message type corresponds to one control plane entity type.

Optionally, the processor is further configured to:

generate a second message, where the second message includes one or more of the first identifier and the second identifier; and the transceiver is further configured to send the second message to the terminal.

Optionally, the first message is an RRC message in which a non-access stratum protocol data unit NAS PDU is encapsulated; and the first identifier is in the RRC message, and the second identifier is in the NAS PDU.

Optionally, the first message is an RRC message in which a non-access stratum protocol data unit NAS PDU is encapsulated; and both the first identifier and the second identifier are in the RRC message.

An embodiment of this application provides a communications apparatus, including:

a processor, configured to generate a first message including a first identifier, where the first identifier is used to indicate a network slice for which the first message is destined; and a transceiver, configured to send the first message to a network device.

Optionally, the first message further includes a second identifier, the second identifier is used to indicate a message type of the first message, and each message type corresponds to one control plane entity type.

Optionally, the transceiver is further configured to:

receive a second message sent by the network device, where the second message includes one or more of the first identifier and the second identifier.

An embodiment of this application provides a communication method, including:

receiving, by a core network device, a first message that is sent by a terminal through an access network device and that includes a slice identifier, where the slice identifier is used to indicate a network slice for which the first message is destined; and sending, by the core network device based on the slice identifier, the first message to the network slice for which the first message is destined.

Optionally, the method further includes:

generating, by the core network device, a second message, where the second message includes the slice identifier; and sending, by the core network device, the second message to the terminal through the access network device.

Optionally, the first message is an RRC message in which a non-access stratum protocol data unit NAS PDU is encapsulated; and the slice identifier is in the NAS PDU.

Optionally, the method further includes:

receiving, by the core network device, a third message that is sent by a network slice and that includes a slice identifier, where the third message is a paging message; and sending, by the core network device, the third message to the terminal through the access network device.

An embodiment of this application provides a communication method, including:

generating, by a terminal, a first message including a slice identifier, where the slice identifier is used to indicate a network slice for which the first message is destined; and sending, by the terminal, the first message to a core network device through an access network device.

Optionally, the method further includes:

receiving, by the terminal, a second message that is sent by the core network device and that includes a slice identifier; and sending, by the terminal based on the slice identifier, the second message to a network slice that is of the terminal and that corresponds to the slice identifier.

Optionally, the method further includes:

receiving, by the terminal, a third message that is sent by the core network device and that includes a slice identifier, where the third message is a paging message; and sending, by the terminal based on the slice identifier, the third message to a network slice that is of the terminal and that corresponds to the slice identifier.

An embodiment of this application provides a communications apparatus, including:

a transceiver unit, configured to receive a first message that is sent by a terminal through an access network device and that includes a slice identifier, where the slice identifier is used to indicate a network slice for which the first message is destined; and a processing unit, configured to send, based on the slice identifier, the first message to the network slice for which the first message is destined.

Optionally, the processing unit is further configured to generate a second message, where the second message includes the slice identifier; and the transceiver unit is further configured to send the second message to the terminal through the access network device.

Optionally, the first message is an RRC message in which a non-access stratum protocol data unit NAS PDU is encapsulated; and the slice identifier is in the NAS PDU.

Optionally, the transceiver unit is further configured to:

receive a third message that is sent by a network slice and that includes a slice identifier, where the third message is a paging message; and send the third message to the terminal through the access network device.

An embodiment of this application provides a communications apparatus, including:

a processing unit, configured to generate a first message including a slice identifier, where the slice identifier is used to indicate a network slice for which the first message is destined; and a transceiver unit, configured to send the first message to a core network device through an access network device.

Optionally, the transceiver unit is further configured to:

receive a second message that is sent by the core network device and that includes a slice identifier; and send, based on the slice identifier, the second message to a network slice that is of the terminal and that corresponds to the slice identifier.

Optionally, the transceiver unit is further configured to:

receive a third message that is sent by the core network device and that includes a slice identifier, where the third message is a paging message; and send, based on the slice identifier, the third message to a network slice that is of the terminal and that corresponds to the slice identifier.

An embodiment of this application provides a communications apparatus, including:

a transceiver, configured to receive a first message that is sent by a terminal through an access network device and that includes a slice identifier, where the slice identifier is used to indicate a network slice for which the first message is destined; and a processor, configured to send, based on the slice identifier, the first message to the network slice for which the first message is destined.

Optionally, the processor is further configured to generate a second message, where the second message includes the slice identifier; and the transceiver is further configured to send the second message to the terminal through the access network device.

Optionally, the first message is an RRC message in which a non-access stratum protocol data unit NAS PDU is encapsulated; and the slice identifier is in the NAS PDU.

Optionally, the transceiver is further configured to:

receive a third message that is sent by a network slice and that includes a slice identifier, where the third message is a paging message; and send the third message to the terminal through the access network device.

An embodiment of this application provides a communications apparatus, including:

a processor, configured to generate a first message including a slice identifier, where the slice identifier is used to indicate a network slice for which the first message is destined; and a transceiver, configured to send the first message to a core network device through an access network device.

Optionally, the transceiver is further configured to:

receive a second message that is sent by the core network device and that includes a slice identifier; and send, based on the slice identifier, the second message to a network slice that is related to the terminal and that corresponds to the slice identifier.

Optionally, the transceiver is further configured to:

receive a third message that is sent by the core network device and that includes a slice identifier, where the third message is a paging message; and send, based on the slice identifier, the third message to a network slice that is of the terminal and that corresponds to the slice identifier.

An embodiment of this application provides a communication method, including:

receiving, by an access network device, a paging message sent by a network slice of a core network device, where the paging message is used to page a terminal; and adding, by the access network device, a slice identifier of the network slice to the paging message, and forwarding, to the terminal, the paging message to which the slice identifier has been added.

An embodiment of this application provides a communication method, including:

receiving, by a terminal, a paging message that is sent by an access network device and that includes a slice identifier, where the paging message is used to page the terminal; and forwarding, by the terminal based on the slice identifier, the paging message to a network slice that is of the terminal and that corresponds to the slice identifier.

An embodiment of this application provides a communication method, including:

generating, by a network device, a first message including a first identifier, where the first identifier is used to indicate a message type of the first message, and each message type corresponds to one control plane entity type; and sending, by the network device, the first message to a terminal.

Optionally, the first message further includes a second identifier, and the second identifier is used to indicate a network slice for which the first message is destined or a control plane entity for which the first message is destined.

Optionally, the network device is an access network device or a core network device.

An embodiment of this application provides a communication method, including:

generating, by a network device, a first message including a first identifier, where the first identifier is used to indicate a network slice for which the first message is destined or a control plane entity for which the first message is destined; and sending, by the network device, the first message to a terminal.

Optionally, the first message further includes a second identifier, the second identifier is used to indicate a message type of the first message, and each message type corresponds to one control plane entity type.

Optionally, the network device is an access network device or a core network device.

An embodiment of this application provides a computer readable storage medium, where the computer storage medium stores a computer readable instruction, and when a computer reads and executes the computer readable instruction, the computer performs the method in any one of the foregoing aspects or any possible design of any one of the foregoing aspects.

An embodiment of this application provides a computer program product, where when a computer reads and executes the computer program product, the computer performs the method in any one of the foregoing aspects or any possible design of any one of the foregoing aspects.

An embodiment of this application provides a chip, where the chip is connected to a memory, and is configured to read and execute a software program stored in the memory, to implement the method in any one of the foregoing aspects or any possible design of any one of the foregoing aspects.

DESCRIPTION OF EMBODIMENTS

Figure 1:
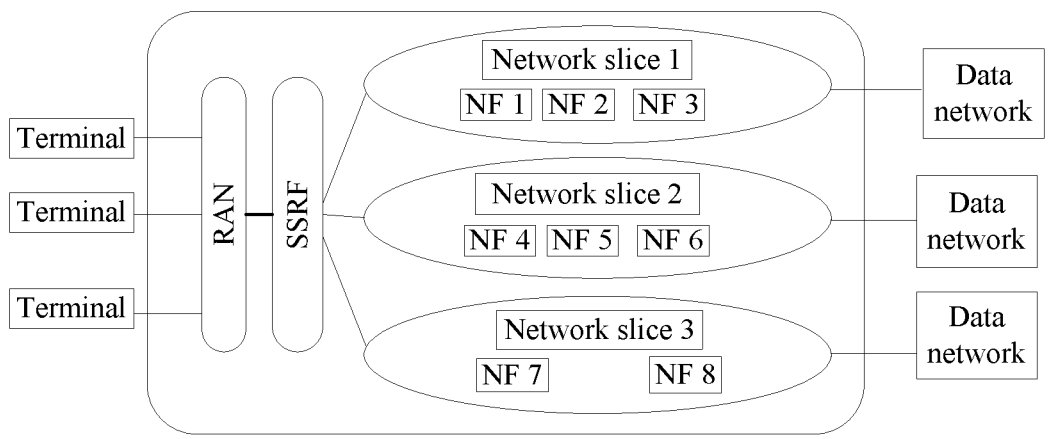
FIG. 1 is a schematic diagram of a possible 5G network architecture.

Some terms in this application are explained and described below, to help persons skilled in the art understand this application.

(1) A terminal, also referred to as user equipment (UE), is a device providing voice and/or data connectivity for a user, such as a handheld device or an in-vehicle device having a wireless connection function. For example, common terminals include: a mobile phone, a tablet computer, a notebook computer, a palmtop computer, a mobile Internet device (MID), and a wearable device, such as a smartwatch, a smart band, or a pedometer.

(2) An access network device, also referred to as a base station, is a device that connects a terminal to a wireless network, and includes, but is not limited to: an evolved NodeB (eNB), a radio network controller (RNC), a NodeB (NB), a base station controller (BSC), a base transceiver station (BTS), a home evolved NodeB or home NodeB, or a baseband unit (BBU).

Key driving factors for implementing 5G network slicing are a software defined network SDN (SDN) technology and a network function virtualization (NFV) technology. The SDN technology overturns a network element form, and decouples a network function and hardware, so as to allow a vertical system to be subdivided into programmable function modules. In this way, a connectable horizontal network architecture applicable to a flexibly extended service is formed, and a network connection is provided as a service based on a service requirement through a programmable function. In this way, an objective of "a network as a service" is implemented. A mobile operator configures and manages, hundreds of network slices by configuring and orchestrating a series of network functions on a control platform of a core network (CN). A network slice is related to a series of configuration and support for end-to-end network elements, and covers devices such as user equipment (UE) and a radio access network (RAN) device. In addition to creating the network slice in the CN, on an access network side, network elements on the access network side need to be configured for the core network and an operation, administration, and maintenance OAM entity, to implement differentiated service processing on an end-to-end network slice and ensure a requirement of a corresponding service level agreement (SLA), thereby better supporting the end-to-end network slice.

Network slicing can implement network quality of service (QoS) isolation, perform flexible network management and control, and increase network efficiency. A network manager may map end-to-end QoS requirements to different subnet systems and forwarding devices, and establish a network slice at low costs and at a high rate without affecting an existing service. The slice may open some flexible programmable interfaces to a third-party user, so that the third-party user may design and develop a new network service based on the open interfaces and quickly deploy the network service, to bring considerable economic benefits to an operator and improve usage efficiency of an existing network.

FIG. 1 is a schematic diagram of a possible 5G network architecture. In FIG. 1, a core network may be divided into a plurality of network slice entities. Each network slice entity includes a group of network functions (NF) having specific functions. For example, a network slice 1 in FIG. 1 includes an NF 1, an NF 2, and an NF 3; a network slice 2 includes an NF 4, an NF 5, and an NF 6; and a network slice 3 includes an NF 7 and an NF 8. A RAN is connected to each network slice entity through a slice selection and routing function (SSRF). After accessing the RAN, a terminal selects a proper network slice entity through the SSRF, to access a data network. In this way, a customized service is provided through a specific NF and a parameter configuration, so that a 5G end-to-end network slice architecture is formed.

Figure 2:
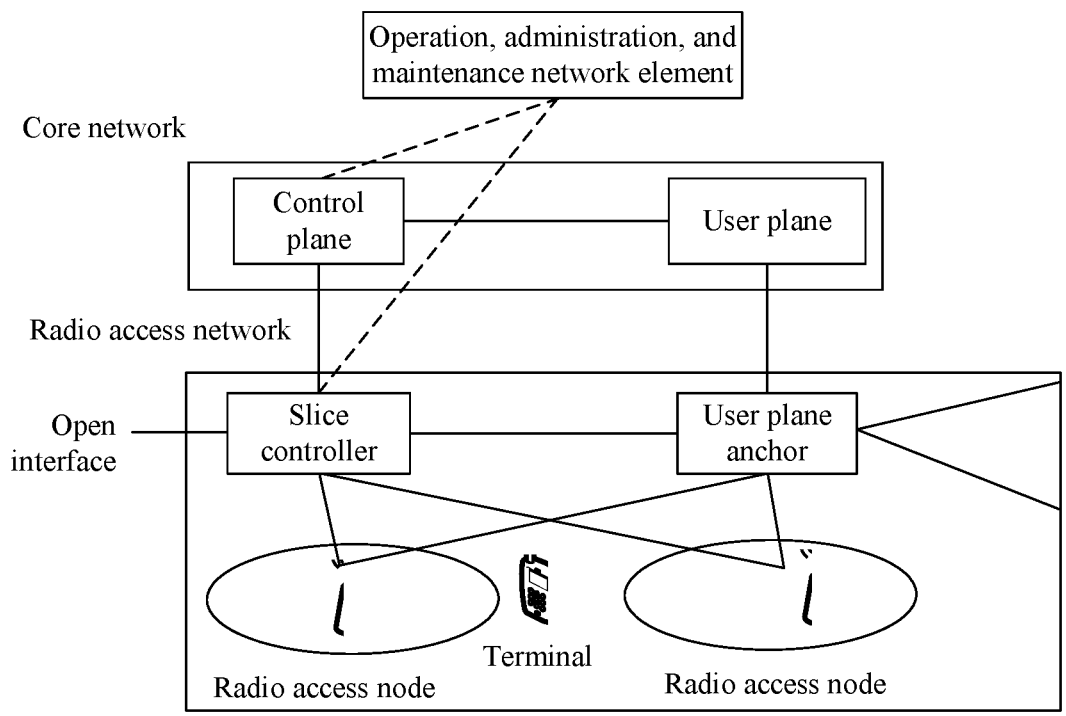
FIG. 2 is a schematic diagram of a system architecture according to an embodiment of this application.

Embodiments of this application may be applied to a mobile communications system, such as a 5G communications system or a Long Term Evolution (LTE) system. FIG. 2 is a schematic diagram of a system architecture according to an embodiment of this application. The system architecture shown in FIG. 2 includes an OAM network element, a CN, a RAN, and a terminal. A CN side includes a control plane (CP) entity and a user plane (UP) entity. A RAN side includes a slice controller, a user plane anchor, and a radio access node.

OAM network element: The OAM network element is mainly responsible for three categories of work depending on an actual requirement of a mobile operator: operation, administration, and maintenance. In terms of operation, the OAM network element mainly performs routine analysis, prediction, planning, and configuration of a network and a service. In terms of maintenance, the OAM network element performs routine operation activities, such as test box fault management performed on the network and the service. An administration function for a CN network slice is initiated by the OAM network element. The OAM network element is responsible for interacting with a control plane module corresponding to the CN and a control plane module corresponding to the RAN, to perform end-to-end network slice management.

CP module on the CN side: The module may be a mobility management entity (MME), a CN mobility management anchor, or CN network slice management entity; and works with the slice controller on the RAN side to perform functions, such as connection management, session management, and mobility management on end-to-end network slices.

Slice controller on the RAN side: As a CP module located on the RAN side, the slice controller is mainly responsible for performing functions based on network slice information that is configured on the CP modules of the CN or on the OAM network element, such as protocol function management, resource allocation, topology management, and inter-slice coordination and management on the RAN side; and mobility management, system information, paging, and measurement on the RAN side. The slice controller may serve as an independent network element, or may be deployed as an internal function module of a base station or as an internal function module of a network element on the RAN side. In a cloud radio access network (cloud RAN, C-RAN) architecture, each protocol layer may be flexibly segmented, and the slice controller may be further flexibly deployed in a baseband unit (BBU) or a remote radio unit (RRU), or may be deployed in a BBU and an RRU in a distributed manner. The radio access network may include a relay scenario, and the slice controller may be flexibly deployed in a donor eNodeB (DeNB) or a relay node (RN).

Figure 3:
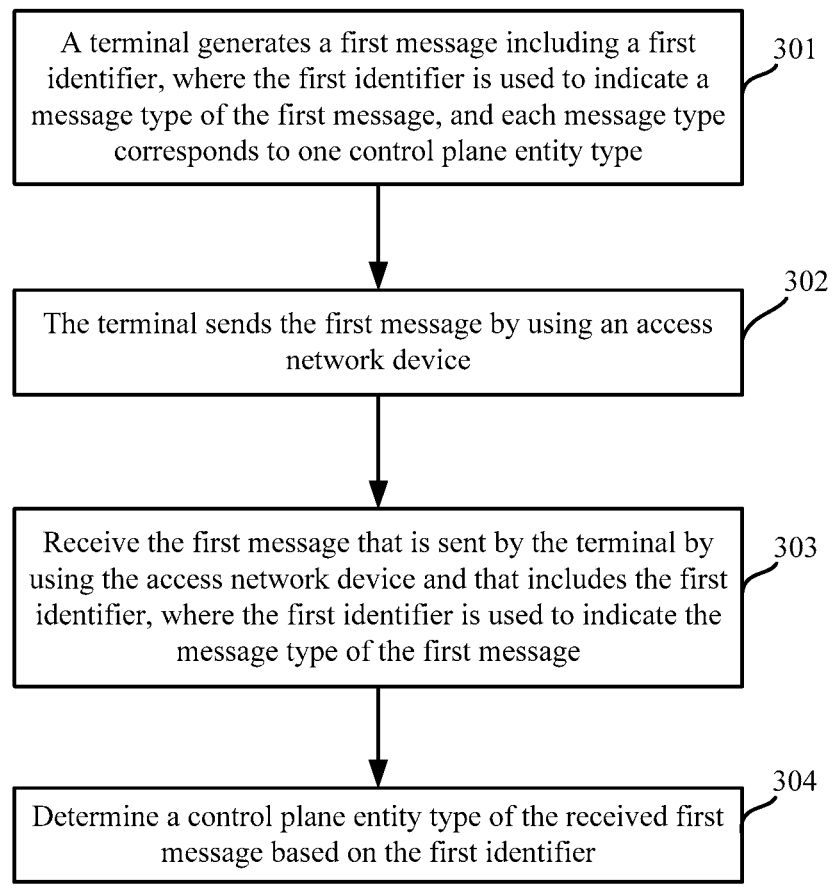
FIG. 3 is a schematic flowchart of a communication method according to an embodiment of this application.

Based on the foregoing description, FIG. 3 is a schematic flowchart of a communication method according to an embodiment of this application.

In a process of the method shown in FIG. 3, step 303 and step 304 may be performed by an access network device, a core network device, a common control plane (common control plane) entity, or the like.

Referring to FIG. 3, the method includes the following steps.

Step 301: A terminal generates a first message including a first identifier, where the first identifier is used to indicate a message type of the first message, and each message type corresponds to one control plane entity type.

In this embodiment of this application, the terminal may include a non-access stratum proxy (NAS proxy) entity and a control plane entity that is related to a network slice, such as an MM entity or an SM entity. The NAS proxy entity is mainly configured to identify the first identifier and a second identifier. Therefore, the terminal may identify the first identifier and the second identifier through the NAS proxy entity in the terminal.

The control plane entity may include, but is not limited to, a mobility management (MM) entity, a session management (SM) entity, or the like. One MM entity may be shared by a plurality of SM entities.

In this embodiment of this application, the first message may be a radio resource control (RRC) message in which a non-access stratum protocol data unit (NAS PDU) is encapsulated. When the first message is an RRC message in which a NAS PDU is encapsulated, there may be the following several cases for the first identifier and the second identifier existing in the RRC message: (1) Both the first identifier and the second identifier may be in the NAS PDU of the RRC message. (2) Both the first identifier and the second identifier may be in the RRC message, where specifically both the first identifier and the second identifier may be in a portion of the RRC message except the NAS PDU. (3) The first identifier is in the NAS PDU of the RRC message, and the second identifier is in the RRC message, where specifically the second identifier is in a portion of the RRC message except the NAS PDU. (4) The second identifier is in the NAS PDU of the RRC message, and the first identifier is in the RRC message, where specifically the first identifier is in a portion of the RRC message except the NAS PDU.

Step 302: The terminal sends the first message through an access network device.

Step 303: Receive the first message that is sent by the terminal through the access network device and that includes the first identifier, where the first identifier is used to indicate the message type of the first message.

Step 304: Determine a control plane entity type to receive first message based on the first identifier.

One terminal may be connected to a plurality of network slices. In this embodiment of this application, a security mechanism applicable to the plurality of network slices may be in one or more of the following manners.

1. Messages of SM entities and MM entities of all network slices for each terminal use a same encryption mechanism. In this way, a core network device can decode and forward a proper SM message.

2. MM entities of all network slices for each terminal use a common encryption mechanism, and SM entities of different network slices use different encryption mechanisms. In this way, a core network device cannot decode an SM message.

3. MM entities of all network slices for each terminal use an encryption mechanism of one of the network slices, and SM entities of different network slices use different encryption mechanisms.

This embodiment of this application may be applied to a plurality of scenarios, which are separately described below.

Figure 4:
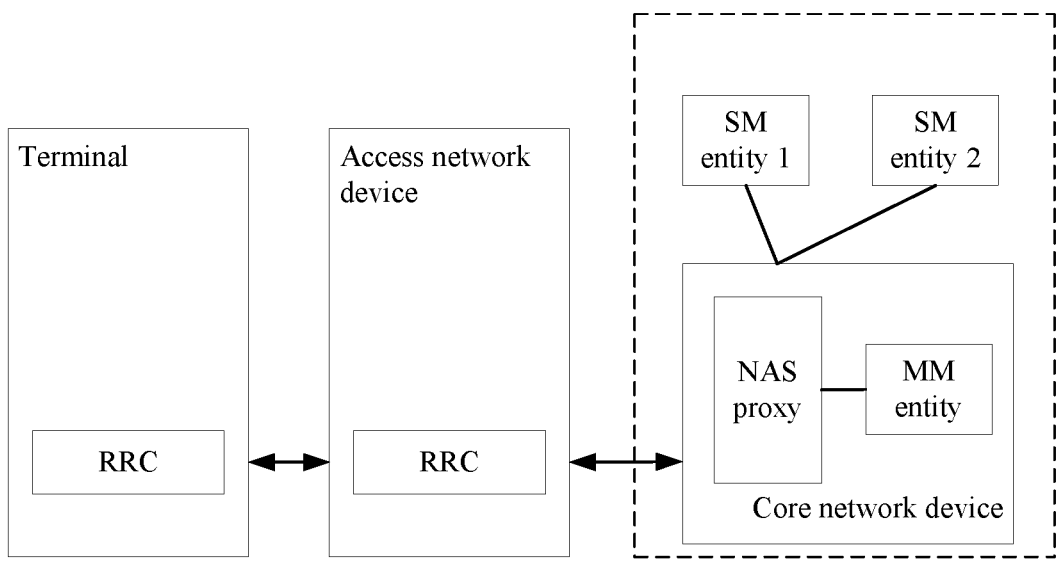
FIG. 4 is a schematic diagram of a network architecture according to an embodiment of this application.

In a first possible scenario, step 303 and step 304 are performed by a core network device. Specifically, FIG. 4 is a schematic diagram of a network architecture according to an embodiment of this application. In FIG. 4, a terminal is connected to a core network device through an access network device. The core network device may include a plurality of types of control plane entities. In this embodiment of this application, a description is made through an example in which the core network device includes a NAS proxy entity and an MM entity. The NAS proxy entity is mainly configured to identify the first identifier and the second identifier. It needs to be noted that, alternatively, the core network device may not include an MM entity.

One MM entity may be shared by a plurality of SM entities. In FIG. 4, a description is made by only using an example in which one MM entity is shared by two SM entities (which are respectively an SM entity 1 and an SM entity 2). For another case, refer to the description in this embodiment of this application. Details are not described herein.

In FIG. 4, there is only one RRC connection between the terminal and the access network device, and the terminal is connected to both a network slice 1 and a network slice 2. The terminal also includes the NAS proxy entity. In addition, the terminal sends an RRC message to the access network device through an RRC entity.

There is only one NAS connection between the terminal and the core network device. The network slice 1 and the network slice 2 share one common MM function entity. Both a NAS message corresponding to the SM entity 1 of the network slice 1 and a NAS message corresponding to the SM entity 2 of the network slice 2 need to pass through the core network device. The SM entity 1 and the SM entity 2 are invisible to the access network device.

In this embodiment of this application, the NAS proxy entity may be a logical entity, may be physically deployed as a portion of the MM function entity in the MM function entity, or may be deployed as an independent module, for example, may be deployed together with the MM function entity in the core network device.

With reference to FIG. 3 and FIG. 4, in step 301, the terminal may generate a NAS message through a NAS of the terminal, an SM entity or an MM entity at the NAS adds the first identifier to the NAS message, and then the RRC entity of the terminal generates the first message based on the NAS message. The first identifier may indicate a specific entity type of the first message. For example, the first message is a message of an SM entity type or a message of an MM entity type.

Optionally, the terminal may further generate a second identifier in the first message, where the second identifier is used to indicate a network slice for which the first message is destined or a control plane entity for which the first message is destined. The second identifier may be a control plane entity identifier or a network slice identifier. The network slice identifier may include, but is not limited to, a network standard identifier, such as an identifier of a Global System for Mobile Communications (GSM), an identifier of a Universal Mobile Telecommunications System (UMTS), an identifier of an LTE (Long Term Evolution) system, an identifier of a 5G system, or an identifier of a Wi-Fi system. Alternatively, the second identifier may be an SRB (signaling radio bearer) identifier or a DRB (data radio bearer) identifier. Each SRB identifier or each DRB identifier corresponds to one network slice. A correspondence between each SRB identifier or each DRB identifier and a network slice may be agreed on in advance. Details are not described herein.

In step 302, the terminal encapsulates the first message in an RRC message and sends the RRC message to the access network device, so that the access network device sends, to the core network device, the RRC message in which the first message is encapsulated.

In step 303, after receiving the RRC message in which the first message is encapsulated, the core network device that includes the NAS proxy entity parses the RRC message to obtain the first message.

In step 304, the core network device first determines a control plane entity type to receive first message based on the first identifier; determines, based on the second identifier, a control plane entity that is to receive the first message in a network slice; and then sends the first message to the control plane entity in the network slice for which the first message is destined.

For example, a receiving party of the first message sent by the terminal is the SM1 entity. The first message sent by the terminal includes the first identifier and the second identifier. In this case, the first identifier indicates that the first message is a message of the SM entity type, and the second identifier indicates that the control plane entity for which the first message is destined is the SM1 entity. After receiving the first message, the core network device first determines, based on the first identifier, that the first message is a message of the SM entity type; determines, based on the second identifier, that the control plane entity for which the first message is destined is the SM1 entity; and then forwards the first message to the SM1 entity.

It needs to be noted that when the control plane entity for which the first message is destined can be uniquely determined based on the first identifier, alternatively the first message may include only the first identifier.

For example, a receiving party of the first message sent by the terminal is the MM entity. The first message sent by the terminal includes the first identifier. In this case, the first identifier indicates that the first message is a message of the MM entity type. After receiving the first message, the core network device first determines, based on the first identifier, that the first message is a message of the MM entity type. Because there is only one MM entity on a core network side, in this case, the core network device can determine that the control plane entity for which the first message is destined is the MM entity, and then forwards the first message to the MM entity.

Alternatively, the core network device may send a message including one or more of the first identifier and the second identifier to the terminal. Specifically, the core network device may generate a second message including one or more of the first identifier and the second identifier, and send the second message to the terminal through the access network device. Alternatively, the core network device may receive a second message that is generated by a control plane entity (such as an MM entity or an SM entity) and that includes one or more of the first identifier and the second identifier, and send the second message to the terminal through the access network device. Alternatively, the second message may be a NAS message.

Correspondingly, after receiving the second message that is sent by the access network device and that includes the first identifier, the terminal may determine, based on the first identifier, a control plane entity type of the second message that is received by the terminal. When the second message further includes the second identifier, the terminal may further send, based on the second identifier, the second message to a control plane entity that is of the terminal and that is in a network slice for which the second message is destined. For details, refer to the description on a core network device side. Details are not described herein again.

For example, a receiving party of the second message is an SM entity of the terminal. The second message received by the terminal includes the first identifier and the second identifier. In this case, the first identifier indicates that the second message is a message of the SM entity type, and the second identifier indicates that the control plane entity for which the second message is destined is the SM entity of the terminal. After receiving the second message, the terminal first determines, based on the first identifier, that the second message is a message of the SM entity type; determines, based on the second identifier, that the control plane entity for which the second message is destined is the SM entity of the terminal; and then forwards the second message to the SM entity of the terminal.

Figure 5:
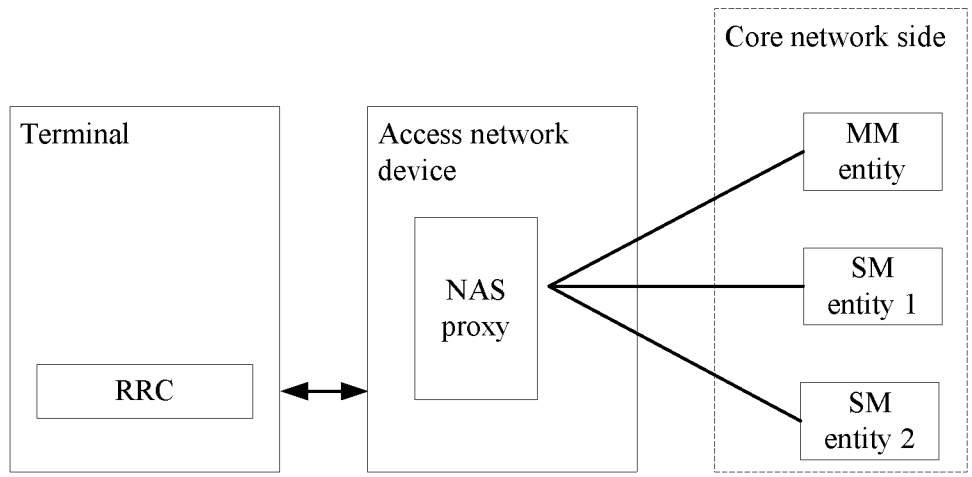
FIG. 5 is a schematic diagram of a network architecture according to an embodiment of this application.

In a second possible scenario, step 303 and step 304 are performed by an access network device that includes a NAS proxy entity. FIG. 5 is a schematic diagram of a network architecture according to an embodiment of this application. A terminal, an access network device, an MM entity, an SM entity 1, and an SM entity 2 are included in FIG. 5. The terminal is connected to the MM entity, the SM entity 1, and the SM entity 2 that are on a core network side through the access network device.

In FIG. 5, a description is made by only using an example in which the MM entity is shared by the SM entity 1 and the SM entity 2. For another case, refer to the description in this embodiment of this application. Details are not described herein.

In FIG. 5, there is only one RRC connection between the terminal and the access network device, and the terminal is connected to both a network slice 1 and a network slice 2. The terminal also includes the NAS proxy entity. In addition, the terminal sends an RRC message to the access network device through an RRC entity.

There is only one NAS connection between the terminal and a common control plane entity on the core network side. The SM entity 1 of the network slice 1, the SM entity 2 of the network slice 2, and the MM entity are separately connected to the access network device.

With reference to FIG. 3 and FIG. 5, in step 301, the first message may be an RRC message in which a NAS PDU is encapsulated. In this case, the first identifier may be in the RRC message, and is specifically in a portion of the RRC message except the NAS PDU. The first identifier may indicate a specific entity type of the first message. For example, the first identifier may indicate that the first message is a message of an SM entity type or a message of an MM entity type.

Optionally, the terminal may further generate a second identifier in the first message, where the second identifier is used to indicate a network slice for which the first message is destined or a control plane entity for which the first message is destined. The second identifier may be a control plane entity identifier or a network slice identifier. When the first message is an RRC message, the second identifier is also in the RRC message, and is specifically in a portion of the RRC message except the NAS PDU.

In step 302, the terminal sends the first message to the access network device.

In step 303, after receiving the first message, the access network device determines the first identifier from the first message.

In step 304, the access network device first determines a control plane entity type to receive first message based on the first identifier.

For example, a receiving party of the first message sent by the terminal is the SM1 entity. The first message sent by the terminal includes the first identifier. In this case, the first identifier indicates that the first message is a message of the SM entity type. After receiving the first message, the access network device may determine, based on the first identifier, that the first message is a message of the SM entity type. When the first message further includes the second identifier, the access network device then determines, based on the second identifier, the control plane entity for which the first message is destined. For example, if the access network device determines, based on the second identifier, that the control plane entity for which the first message is destined is the SM1 entity, the access network device forwards the first message to the SM1 entity.

The access network device first determines the control plane entity type to receive first message based on the first identifier. For example, a receiving party of the first message sent by the terminal is the SM1 entity. The first message sent by the terminal includes the first identifier. In this case, the first identifier indicates that the first message is a message of the SM entity type. After receiving the first message, the access network device may determine, based on the first identifier, that the first message is a message of the SM entity type. When the first message further includes the second identifier, the access network device then determines, based on the second identifier, that the control plane entity for which the first message is destined is the SM1 entity, and then forwards the first message to the SM1 entity.

It needs to be noted that, when the control plane entity for which the first message is destined can be uniquely determined based on the first identifier, the first message may alternatively include only the first identifier, for example, when the terminal is allowed to access only one network slice, or each network slice accessed by the terminal corresponds to one RRC entity.

For example, a receiving party of the first message sent by the terminal is the MM entity. The first message sent by the terminal includes the first identifier. In this case, the first identifier indicates that the first message is a message of the MM entity type. After receiving the first message, the access network device first determines, based on the first identifier, that the first message is a message of the MM entity type. Because there is only one MM entity on the core network side, in this case, the access network device can determine that the control plane entity for which the first message is destined is the MM entity, and then forwards the first message to the MM entity.

Correspondingly, after receiving a second message that is sent by a network device and that includes the first identifier, the terminal may determine, based on the first identifier, a control plane entity type of the second message that is received by the terminal. When the second message further includes the second identifier, the terminal may further send, based on the second identifier, the second message to a control plane entity that is of the terminal and that is in a network slice for which the second message is destined. For details, refer to the description on a core network device side. Details are not described herein again.

For example, a receiving party of the second message is an SM entity of the terminal. The second message received by the terminal includes the first identifier and the second identifier. In this case, the first identifier indicates that the second message is a message of the SM entity type, and the second identifier indicates that the control plane entity for which the second message is destined is the SM entity of the terminal. After receiving the second message, the terminal first determines, based on the first identifier, that the second message is a message of the SM entity type; determines, based on the second identifier, that the control plane entity for which the second message is destined is the SM entity of the terminal; and then forwards the second message to the SM entity of the terminal.

In the foregoing method, a device such as the terminal sends information such as the first identifier in the first message, so that a receiving party that receives the first message determines the type of the control plane entity for which the first message is destined, so as to route the first message from the terminal to the control plane entity type that is to receive the first message, thereby improving network efficiency.

Correspondingly, a device such as the core network device determines the control plane entity type that is to receive the first message by receiving the first identifier in the first message that is sent through the access network device by the terminal, so as to route the first message from the terminal to the control plane entity type to receive first message, thereby improving network efficiency.

Figure 6:
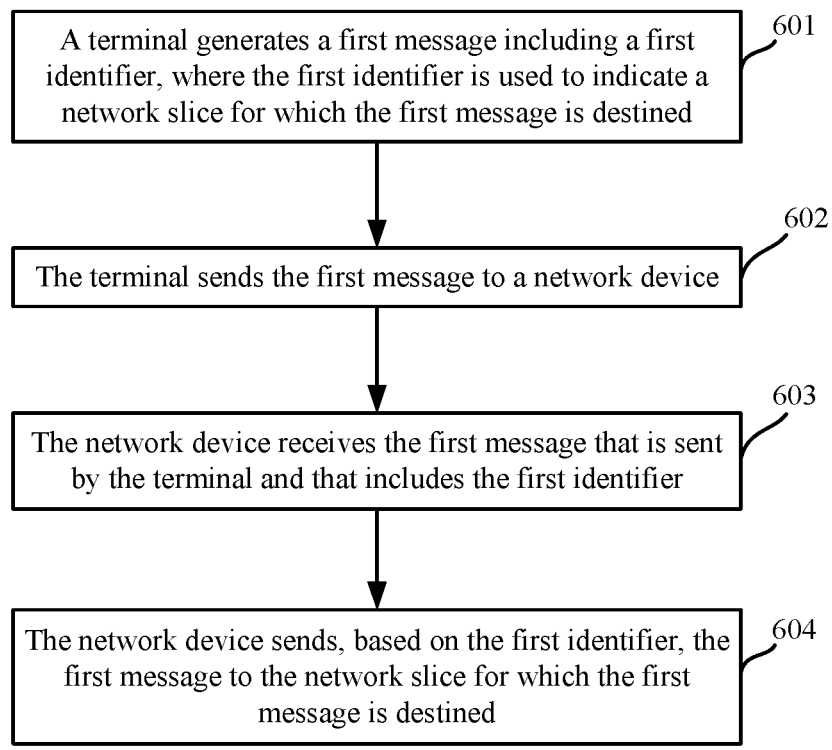
FIG. 6 is a schematic flowchart of a communication method according to an embodiment of this application.

Based on the foregoing description, FIG. 6 is a schematic flowchart of a communication method according to an embodiment of this application.

In a procedure of the method shown in FIG. 6, step 603 and step 604 may be performed by a network device such as an access network device or a device that includes a NAS proxy entity.

Referring to FIG. 6, the method includes the following steps.

Step 601: A terminal generates a first message including a first identifier, where the first identifier is used to indicate a network slice for which the first message is destined.

In this embodiment of this application, the terminal may include the NAS proxy entity and a control plane entity that is related to a network slice, such as an MM entity or an SM entity. The terminal may identify the first identifier and a second identifier through the NAS proxy entity in the terminal.

It needs to be noted that the first identifier in step 601 to step 603 is different from the first identifier in step 301 to step 304, and is herein named simply for ease of description. Each identifier is specifically subject to a role of the identifier.

The first identifier in step 601 may be a network slice identifier, or may be an SRB identifier or a DRB identifier. Each SRB identifier or each DRB identifier corresponds to one network slice. A correspondence between each SRB identifier or each DRB identifier and a network slice may be agreed on in advance. Details are not described herein.

The first message may further include a second identifier, where the second identifier is used to indicate a message type of the first message, and each message type corresponds to one control plane entity type. The control plane entity may include, but is not limited to, an entity such as an MM entity or an SM entity. One MM entity may be shared by a plurality of SM entities, or one MM entity corresponds to one SM entity. Correspondingly, the second identifier in step 601 to step 603 is different from the second identifier in step 301 to step 304, and is named herein simply for ease of description. Each identifier is specifically subject to a role of the identifier.

Optionally, the first message may be an RRC message in which a NAS PDU is encapsulated. When the first message is an RRC message in which a NAS PDU is encapsulated, there may be the following several cases for the first identifier and the second identifier existing in the RRC message: (1) Both the first identifier and the second identifier may be in the NAS PDU of the RRC message. (2) Both the first identifier and the second identifier may be in the RRC message, where specifically both the first identifier and the second identifier may be in a portion of the RRC message except the NAS PDU. (3) The first identifier is in the NAS PDU of the RRC message, and the second identifier is in the RRC message, where specifically the second identifier is in a portion of the RRC message except the NAS PDU. (4) The second identifier is in the NAS PDU of the RRC message, and the first identifier is in the RRC message, where specifically the first identifier is in a portion of the RRC message except the NAS PDU.

Step 602: The terminal sends the first message to a network device.

If the network device is an access network device, the terminal may directly send the first message to the network device. If the network device is a device that includes a NAS proxy entity, the terminal may send the first message to the network device through an access network device. In other words, the terminal first sends the first message to the access network device, and then the access network device forwards the first message to the network device.

Step 603: The network device receives the first message that is sent by the terminal and that includes the first identifier.

Step 604: The network device sends, based on the first identifier, the first message to the network slice for which the first message is destined.

The network device may further generate a second message including one or more of the first identifier and the second identifier, and send the second message to the terminal, so as to route the second message from the network device to the terminal.

Optionally, the network device may further receive a third message sent by a control plane entity, such as a mobility management entity or a session management entity, where the third message includes one or more of the first identifier and the second identifier; and then the network device sends the third message to the terminal, so as to route the third message from the control plane entity to the terminal.

This embodiment of this application may be applied to a plurality of scenarios, which are separately described below.

Figure 7:
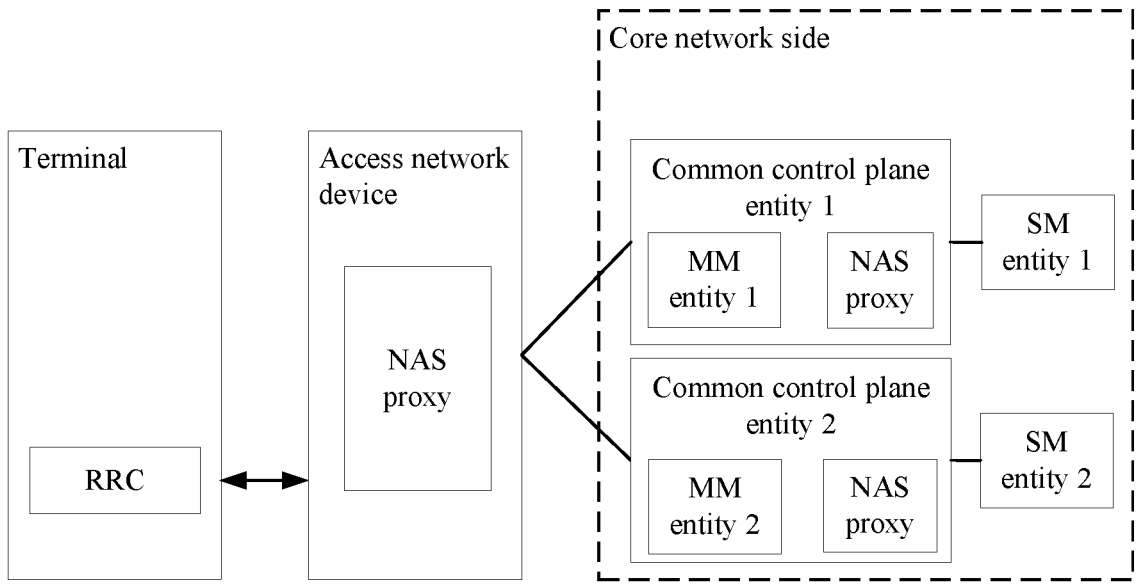
FIG. 7 is a schematic diagram of a network architecture according to an embodiment of this application.

In a first possible scenario, step 603 and step 604 are performed by an access network device that includes a NAS proxy entity. FIG. 7 is a schematic diagram of a network architecture according to an embodiment of this application. A terminal, an access network device, a common control plane entity 1, a common control plane entity 2, an SM entity 1, and an SM entity 2 are included in FIG. 7. The terminal is connected to the common control plane entity 1 and the common control plane entity 2 that are on a core network side through the access network device. The common control plane entities may include a plurality of types of control plane entities. In this embodiment of this application, a description is made through an example in which the access network device includes a NAS proxy entity, and the common control plane entity includes a NAS proxy entity and an MM entity. It needs to be noted that, alternatively, the common control plane entity may not include an MM entity.

In FIG. 7, a description is made by only using an example in which one MM entity corresponds to one SM entity (respectively, the SM entity 1 corresponds to an MM entity 1, and the SM entity 2 corresponds to an MM entity 2). For another case, refer to the description in this embodiment of this application. Details are not described herein.

In FIG. 7, there is only one RRC connection between the terminal and the access network device, and the terminal is connected to both a network slice 1 and a network slice 2. The terminal also includes the NAS proxy entity. In addition, the terminal sends an RRC message to the access network device through an RRC entity.

There is only one NAS connection between the terminal and a common control plane entity on the core network side. A message of the SM entity 1 of the network slice 1 needs to be forwarded through the MM entity 1, and the MM entity 1 is connected to the access network device through the common control plane entity 1. A message of the SM entity 2 of the network slice 2 needs to be forwarded through the MM entity 2, and the MM entity 2 is connected to the access network device through the common control plane entity 2.

With reference to FIG. 6 and FIG. 7, in step 601, the first message may be an RRC message in which a NAS PDU is encapsulated. In this case, the first identifier may be in the RRC message. The first identifier may indicate a network slice for which the first message is destined. The second identifier may be a control plane entity identifier or a network slice identifier, or may be an SRB identifier or a DRB identifier.

Optionally, the terminal may further generate a second identifier in the first message, where the second identifier is used to indicate a specific entity type of the first message. For example, the first identifier may indicate that the first message is a message of an SM entity type or a message of an MM entity type. When the first message is an RRC message in which a NAS PDU is encapsulated, the second identifier is in the NAS PDU of the RRC message.

In step 602, the terminal sends the first message to the access network device.

In step 603, after receiving the first message, the access network device determines the first identifier from the first message.

In step 604, the access network device first determines, based on the first identifier, the network slice for which the received first message is destined.

For example, the terminal is connected to the network slice 1 and the network slice 2. A receiving party of the first message sent by the terminal is the network slice 1. The first message sent by the terminal includes the first identifier, and the first identifier indicates that the first message is a message destined for the network slice 1. After receiving the first message, the access network device may determine, based on the first identifier, that the first message is destined for the network slice 1, and forward the first message to a control plane entity, such as the MM entity 1, corresponding to the network slice 1.

When the first message further includes the second identifier, a control plane entity in the network slice determines, based on the second identifier, a control plane entity for which the first message is destined.

Correspondingly, after receiving a second message that is sent by a network device and that includes the first identifier, the terminal may determine, based on the first identifier, a network slice for which the second message is destined. When the second message further includes the second identifier, the terminal may further determine a message type of the second message based on the second identifier; and may finally determine, based on the first identifier and the second identifier, a control plane entity that is to receive the second message in the network slice.

For example, the terminal is connected to the network slice 1 and the network slice 2. The SM entity 1 of the network slice 1 corresponds to the MM entity 1, and the SM entity 2 of the network slice 2 corresponds to the MM entity 2. A receiving party of the second message received by the terminal is the SM entity 1 of the terminal. The second message received by the terminal includes the first identifier and the second identifier, the first identifier indicates that the second message is destined for the network slice 1, and the second identifier indicates that the second message is a message of the SM entity type. After receiving the second message, the terminal first determines, based on the first identifier, that the second message is destined for the network slice 1; determines, based on the second identifier, that the second message is a message of the SM entity type, and therefore may determine that the receiving party of the second message is the SM entity 1 of the terminal; and then forwards the second message to the SM entity 1 of the terminal.

Figure 8:
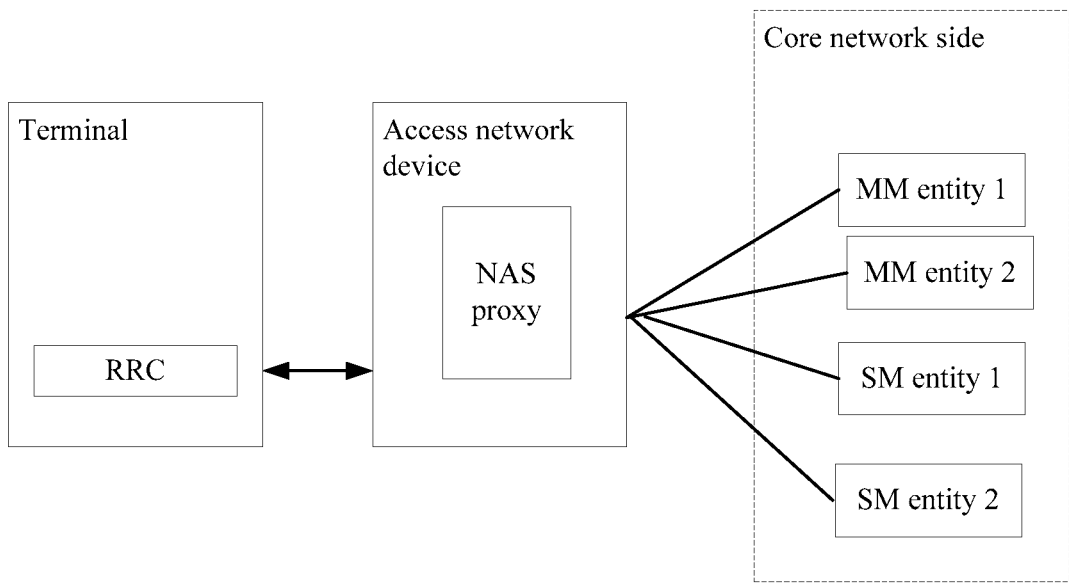
FIG. 8 is a schematic diagram of a network architecture according to an embodiment of this application.

In a second possible scenario, step 603 and step 604 are performed by an access network device that includes a NAS proxy entity. FIG. 8 is a schematic diagram of a network architecture according to an embodiment of this application. A terminal, an access network device, an MM entity 1, an MM entity 2, an SM entity 1, and an SM entity 2 are included in FIG. 8. The terminal is separately connected to the MM entity 1, the MM entity 2, the SM entity 1, and the SM entity 2 that are on a core network side through the access network device.

In FIG. 8, there is only one RRC connection between the terminal and the access network device, and the terminal is connected to both a network slice 1 and a network slice 2. The terminal also includes the NAS proxy entity. In addition, the terminal sends an RRC message to the access network device through an RRC entity.

There is only one NAS connection between the terminal and a core network device. The SM entity 1 and the MM entity 1 of the network slice 1 are connected to the access network device. The SM entity 2 and the MM entity 2 of the network slice 2 are connected to the access network device.

With reference to FIG. 6 and FIG. 8, in step 601, the first message may be an RRC message in which a NAS PDU is encapsulated. In this case, the first identifier may be in the RRC message. The first identifier may indicate a network slice for which the first message is destined. The second identifier may be a control plane entity identifier or a network slice identifier, or may be an SRB identifier or a DRB identifier.

Optionally, the terminal may further generate a second identifier in the first message, where the second identifier is used to indicate a specific entity type of the first message. For example, the first identifier may indicate that the first message is a message of an SM entity type or a message of an MM entity type. The network slice or the control plane entity. When the first message is an RRC message in which a NAS PDU is encapsulated, the second identifier is in the RRC message.

In step 602, the terminal sends the first message to the access network device.

In step 603, after receiving the first message, the access network device determines the first identifier from the first message.

In step 604, the access network device first determines, based on the first identifier, the network slice for which the received first message is destined.

When the first message further includes the second identifier, the access network device then determines, based on the second identifier, a control plane entity for which the first message is destined.

For example, a receiving party of the first message sent by the terminal is the SM entity 1. The first message sent by the terminal includes the first identifier, and the first identifier indicates that the first message is a message destined for the network slice 1. After receiving the first message, the access network device may determine, based on the first identifier, that the first message is destined for the network slice 1. When the first message further includes the second identifier, the access network device then determines, based on the second identifier, that the first message is a message of an SM entity type, so as to determine that the control plane entity for which the first message is destined is the SM entity 1, and then forwards the first message to the SM entity 1.

Correspondingly, the terminal may identify the first identifier and the second identifier through the NAS proxy entity in the terminal. After receiving a second message that is sent by a network device and that includes the first identifier, the terminal may determine, based on the first identifier, a network slice for which the second message is destined. When the second message further includes the second identifier, the terminal may further send, based on the second identifier, the second message to a control plane entity that is of the terminal and that is in a network slice for which the second message is destined. For details, refer to the description on a core network device side. Details are not described herein again.

In the foregoing method, a device such as the terminal sends the first identifier in the first message, so that a receiving party that receives the first message determines, based on the first identifier, the network slice for which the first message is destined, so as to route the first message from the terminal to the network slice for which the first message is destined, thereby improving network efficiency.

Correspondingly, a network device such as the access network device determines, based on the first identifier in the first message that is sent by the terminal, the network slice for which the first message is destined, so as to route the first message from the terminal to the network slice for which the first message is destined, thereby improving network efficiency.

Figure 9:
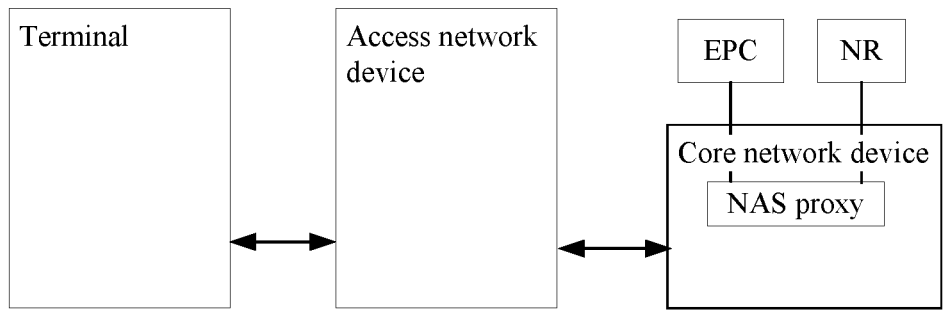
FIG. 9 is a schematic diagram of a network architecture according to an embodiment of this application.

FIG. 9 is a schematic diagram of a network architecture according to an embodiment of this application. A terminal, an access network device, and a core network device that includes a NAS proxy are included in FIG. 9. There is only one RRC connection between the terminal and the access network device. The terminal is connected to both an evolved packet core (EPC) network and a new radio access technology (NR) core network. The two core networks may be considered as two network slices. There is no fine solution for the access network device to determine whether a message sent by the terminal is destined for the EPC or the NR.

Figure 10:
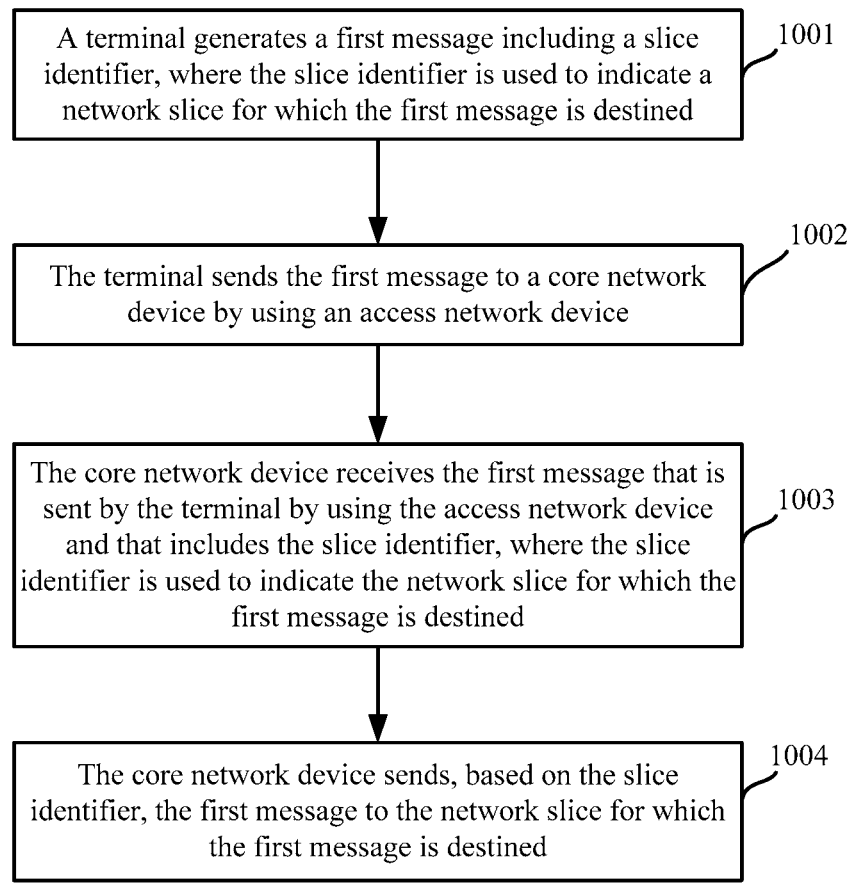
FIG. 10 is a schematic flowchart of a communication method according to an embodiment of this application.

Based on the foregoing description, FIG. 10 is a schematic flowchart of a communication method according to an embodiment of this application.

Step 1001: A terminal generates a first message including a slice identifier, where the slice identifier is used to indicate a network slice for which the first message is destined.

Step 1002: The terminal sends the first message to a core network device through an access network device.

Step 1003: The core network device receives the first message that is sent by the terminal through the access network device and that includes the slice identifier, where the slice identifier is used to indicate the network slice for which the first message is destined.

Step 1004: The core network device sends, based on the slice identifier, the first message to the network slice for which the first message is destined.

In step 1001, the slice identifier may include, but is not limited to, a network standard identifier, such as an identifier of a GSM, an identifier of a UMTS, an identifier of an LTE system, an identifier of a 5G system, or an identifier of a Wi-Fi system. Alternatively, the slice identifier may be an SRB identifier, a DRB identifier, a radio bearer identifier, a logical channel identifier, or the like. Each SRB identifier, each DRB identifier, each radio bearer identifier, or each logical channel identifier corresponds to one network slice. A correspondence between the network slice and each SRB identifier, each DRB identifier, each radio bearer identifier, or each logical channel identifier may be agreed on in advance. Details are not described herein.

Optionally, the first message may be an RRC message in which a NAS PDU is encapsulated. When the first message is an RRC message in which a NAS PDU is encapsulated, the slice identifier may be in the NAS PDU of the RRC message or may be in the RRC message.

The core network device may also generate a second message including the slice identifier, and send the second message to the terminal through the access network device. After receiving the second message that is sent by the core network device and that includes the slice identifier, the terminal may send, based on the slice identifier, the second message to a network slice that is of the terminal and that corresponds to the slice identifier.

Optionally, the core network device may also receive a third message that is generated by a network slice and that includes a slice identifier, and send the third message to the terminal through the access network device. After receiving the third message that includes the slice identifier, the terminal may send, based on the slice identifier, the third message to a network slice that is of the terminal and that corresponds to the slice identifier.

Optionally, the third message is a paging message. When the terminal is in an idle state, the terminal receives a paging message that is sent by a network slice on a core network side and that includes a slice identifier. The terminal may determine, based on the slice identifier in the paging message, a network slice for which the paging message is destined, and forward the paging message to a control plane entity in the network slice for which the paging message is destined.

Optionally, the third message is a paging message. The terminal triggers a user request based on the paging message to recover a user plane. In a possible method, an MM entity combines paging messages from a plurality of SM entities, and sends the paging messages to the terminal through one NAS message. Optionally, in addition to a slice identifier, the message further includes a specified granularity of the user plane that the terminal triggers to recover, such as a user plane belonging to "all slices", "a particular slice", "a particular SM entity", or "a particular data stream". In another optional manner, combined paging messages do not include any SM identifier, and the MM entity records source SM entity information of the paging messages. In another possible method, the MM entity separately encapsulates paging message from different SM entities into NAS messages and sends the NAS messages to the terminal. In this case, optionally, when a paging message from a second SM entity reaches the access network device, triggered by a first paging message, a user has established an RRC connection. In this case, the access network device encapsulates the paging message from the second SM entity into an RRC message and sends the RRC message to the user. In another optional manner, the MM entity sends paging messages from only a particular SM entity, and records information about all SM entities that have sent paging messages. Optionally, a specified data plane of a slice/SM/data stream is recovered. Optionally, a granularity at which a data plane needs to be recovered is specified in a NAS message. For example, "recovery of data planes of all slices", "recovery of a data plane of a particular slice", "recovery of a data plane of a particular SM entity", or "recovery of a data plane of a particular data stream" is identified. In another optional manner, information about a data plane needing to be recovered is not specified. In this case, the MM entity determines how to recover a data plane.

With reference to FIG. 9, after the access network device transparently transmits the first message from the terminal to the core network device, the NAS proxy entity in the core network device identifies, based on the slice identifier (such as an SRB identifier or a DRB identifier), a network slice for which the first message is destined, and sends the first message to the corresponding network slice.

On the downlink, the NAS proxy needs to be implemented on a terminal side, to identify and deliver a NAS message. On a network side, an EPC network NAS or an NR core network NAS adds a slice identifier to a message to be sent to the terminal, or the NAS proxy of the core network device may add a slice identifier at an RRC layer. The NAS PDU is transparently transmitted to the terminal through the RRC layer. An RRC layer of the terminal delivers the NAS PDU to the NAS proxy in the terminal. The NAS proxy in the terminal delivers the NAS message to a corresponding NAS based on the slice identifier in the NAS PDU.

In the foregoing method, when one terminal is connected to a plurality of network slices, such as an EPC network and an NR core network, the access network device or the core network device may identify, based on the slice identifier sent by the terminal, the network slice for which the first message is destined.

It needs to be noted that, in this embodiment of this application, alternatively each network slice may uniquely correspond to one RRC. In other words, each network slice corresponds to one RRC module. Therefore, when NAS messages of different network slices are transparently transmitted through corresponding RRC modules, the terminal and a network element on an access network side may determine, based on an RRC module corresponding to a particular received NAS message, a network slice corresponding to the NAS message that is carried in an RRC message.

Therefore, to identify a NAS message and identify a paging message, because RRC modules are independent of each other, processing is respectively performed at corresponding layers. In this case, only a NAS message type identifier needs to be added, and a NAS message network slice identifier does not need to be added.

Figure 11:
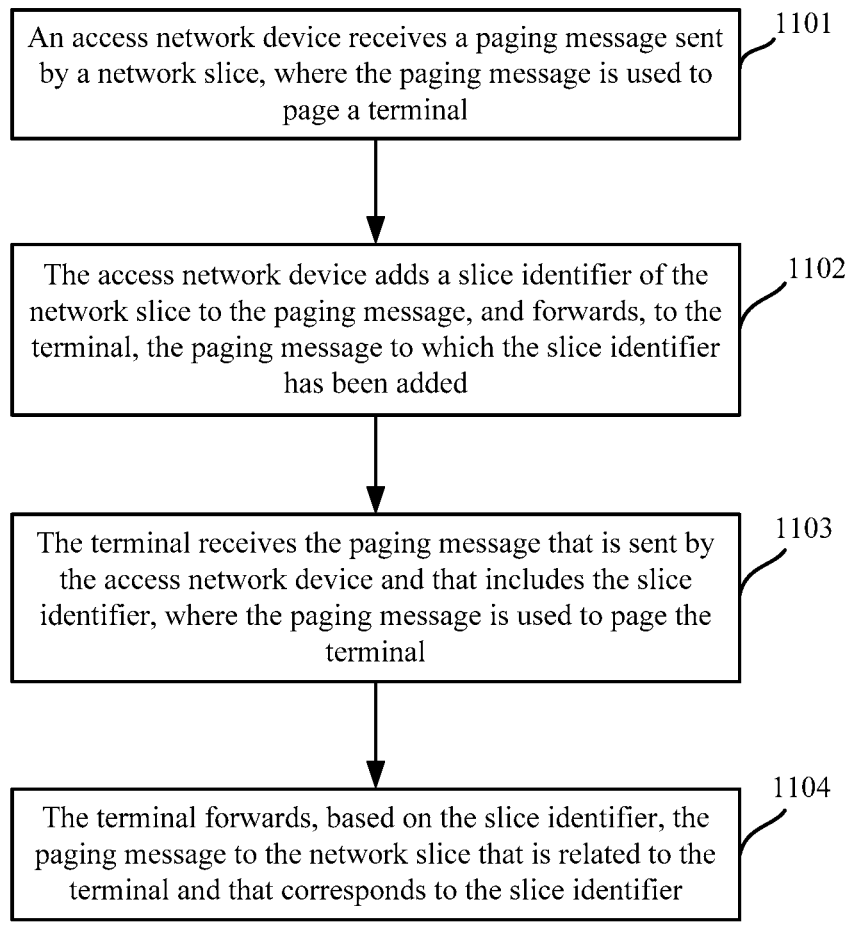
FIG. 11 is a schematic flowchart of a communication method according to an embodiment of this application.

Based on the foregoing description, FIG. 11 is a schematic flowchart of a communication method according to an embodiment of this application.

Step 1101: An access network device receives a paging message sent by a network slice, where the paging message is used to page a terminal.

Step 1102: The access network device adds a slice identifier of the network slice to the paging message, and forwards, to the terminal, the paging message to which the slice identifier has been added.

Step 1103: The terminal receives the paging message that is sent by the access network device and that includes the slice identifier, where the paging message is used to page the terminal.

Step 1104: The terminal forwards, based on the slice identifier, the paging message to the network slice that is of the terminal and that corresponds to the slice identifier.

Figure 12:
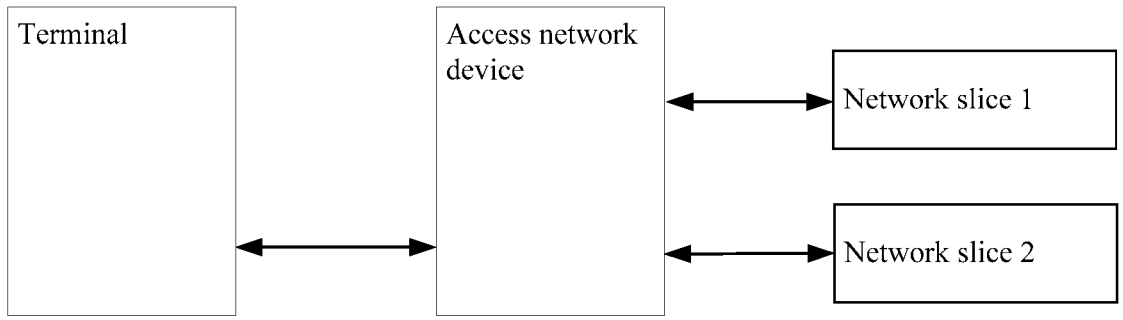
FIG. 12 is a schematic diagram of a network architecture according to an embodiment of this application.

A procedure of the method shown in FIG. 11 may be applied to a network architecture shown in FIG. 12. FIG. 12 is a schematic diagram of a network architecture according to an embodiment of this application. A terminal, an access network device, a network slice 1, a network slice 2, and the like are included in FIG. 12. The terminal is connected to the network slice 1 and the network slice 2 through the access network device. Certainly, the terminal may alternatively be connected to another quantity of network slices. Herein, a description is made through an example in which the terminal is connected to two network slices.

When the terminal is in an idle state, when needing to page the terminal, a network slice connected to the terminal sends a paging message to the terminal through the access network device.

After receiving the paging message sent by the network slice, the access network device adds a slice identifier of the network slice to the paging message, and forwards, to the terminal, the paging message to which the slice identifier has been added.

After receiving the paging message, the terminal may trigger a user request based on the paging message to recover a user plane. In a possible method, an MM entity in the network slice combines paging messages from a plurality of SM entities, and sends the paging messages to the terminal through one NAS message. Optionally, in addition to a slice identifier, the message further includes a specified granularity of the user plane that the terminal triggers to recover, such as a user plane belonging to "all slices", "a particular slice", "a particular SM entity", or "a particular data stream". In another optional manner, combined paging messages do not include any SM identifier, and the MM entity records source SM entity information of the paging messages. In another possible method, the MM entity separately encapsulates paging message from different SM entities into NAS messages and sends the NAS messages to the terminal. In this case, optionally, when a paging message from a second SM entity reaches the access network device, triggered by a first paging message, a user has established an RRC connection. In this case, the access network device encapsulates the paging message from the second SM entity into an RRC message and sends the RRC message to the user. In another optional manner, the MM entity sends paging messages from only a particular SM entity, and records information about all SM entities that have sent paging messages. Optionally, a specified data plane of a slice/SM/data stream is recovered. Optionally, a granularity at which a data plane needs to be recovered is specified in a NAS message. For example, "recovery of data planes of all slices", "recovery of a data plane of a particular slice", "recovery of a data plane of a particular SM entity", or "recovery of a data plane of a particular data stream" is identified. In another optional manner, information about a data plane needing to be recovered is not specified. In this case, the MM entity determines how to recover a data plane.

Based on a same technical idea, an embodiment of this application further provides a communications apparatus. The apparatus can perform the foregoing method embodiment.

Figure 13:
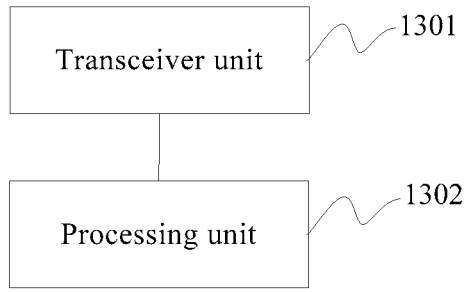
FIG. 13 is a schematic structural diagram of a communications apparatus according to an embodiment of this application.

FIG. 13 is a schematic structural diagram of a communications apparatus according to an embodiment of this application.

Referring to FIG. 13, the apparatus includes:

a transceiver unit 1301, configured to receive a first message that is sent by a terminal through an access network device and that includes a first identifier, where the first identifier is used to indicate a message type of the first message, and each message type corresponds to one control plane entity type; and a processing unit 1302, configured to determine a control plane entity type to receive first message based on the first identifier.

Optionally, the first message further includes a second identifier, and the second identifier is used to indicate a network slice for which the first message is destined or a control plane entity for which the first message is destined; and the processing unit 1302 is further configured to:

send, based on the second identifier, the first message to the control plane entity in the network slice for which the first message is destined.

Optionally, the first message is an RRC message in which a non-access stratum protocol data unit NAS PDU is encapsulated; and both the first identifier and the second identifier are in the NAS PDU.

Optionally, the first message is an RRC message in which a NAS PDU is encapsulated; and both the first identifier and the second identifier are in the RRC message in which the NAS PDU is encapsulated.

Figure 14:
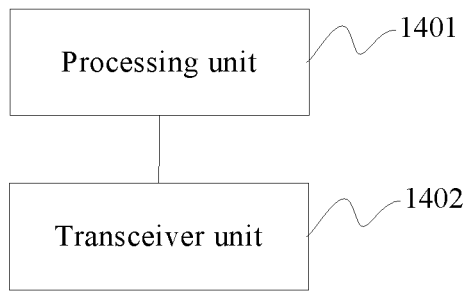
FIG. 14 is a schematic structural diagram of a communications apparatus according to an embodiment of this application.

FIG. 14 is a schematic structural diagram of a communications apparatus according to an embodiment of this application.

Referring to FIG. 14, the apparatus includes:

a processing unit 1401, configured to generate a first message including a first identifier, where the first identifier is used to indicate a message type of the first message, and each message type corresponds to one control plane entity type; and a transceiver unit 1402, configured to send the first message through an access network device.

Optionally, the first message further includes a second identifier, and the second identifier is used to indicate a network slice for which the first message is destined or a control plane entity for which the first message is destined.

Optionally, the transceiver unit 1402 is further configured to:

receive a second message that is sent by the access network device and that includes the first identifier; and the processing unit is further configured to determine, based on the first identifier, a control plane entity type of the second message that is received by the terminal.

Optionally, the second message further includes a second identifier; and the processing unit 1401 is further configured to:

send, based on the second identifier, the second message to a control plane entity that is of the terminal and that is in a network slice for which the second message is destined.

Figure 15:
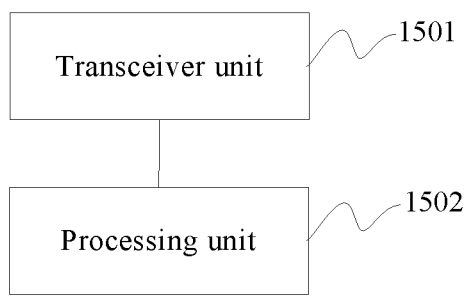
FIG. 15 is a schematic structural diagram of a communications apparatus according to an embodiment of this application.

FIG. 15 is a schematic structural diagram of a communications apparatus according to an embodiment of this application.

Referring to FIG. 15, the apparatus includes:

a transceiver unit 1501, configured to receive a first message that is sent by a terminal and that includes a first identifier, where the first identifier is used to indicate a network slice for which the first message is destined; and a processing unit 1502, configured to send, based on the first identifier, the first message to the network slice for which the first message is destined.

Optionally, the first message further includes a second identifier, the second identifier is used to indicate a message type of the first message, and each message type corresponds to one control plane entity type.

Optionally, the processing unit 1502 is further configured to:

generate a second message, where the second message includes one or more of the first identifier and the second identifier; and the transceiver unit 1501 is further configured to send the second message to the terminal.

Optionally, the first message is an RRC message in which a non-access stratum protocol data unit NAS PDU is encapsulated; and the first identifier is in the RRC message, and the second identifier is in the NAS PDU.

Optionally, the first message is an RRC message in which a non-access stratum protocol data unit NAS PDU is encapsulated; and both the first identifier and the second identifier are in the RRC message.

Figure 16:
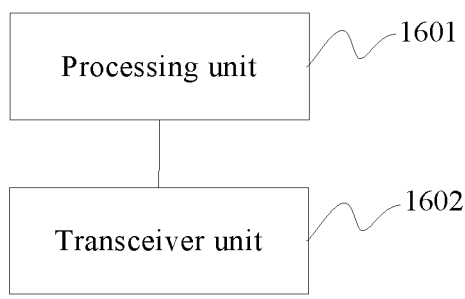
FIG. 16 is a schematic structural diagram of a communications apparatus according to an embodiment of this application.

FIG. 16 is a schematic structural diagram of a communications apparatus according to an embodiment of this application.

Referring to FIG. 16, the apparatus includes:

a processing unit 1601, configured to generate a first message including a first identifier, where the first identifier is used to indicate a network slice for which the first message is destined; and a transceiver unit 1602, configured to send the first message to a network device.

Optionally, the first message further includes a second identifier, the second identifier is used to indicate a message type of the first message, and each message type corresponds to one control plane entity type.

Optionally, the transceiver unit 1602 is further configured to:

receive a second message sent by the network device, where the second message includes one or more of the first identifier and the second identifier.

Figure 17:
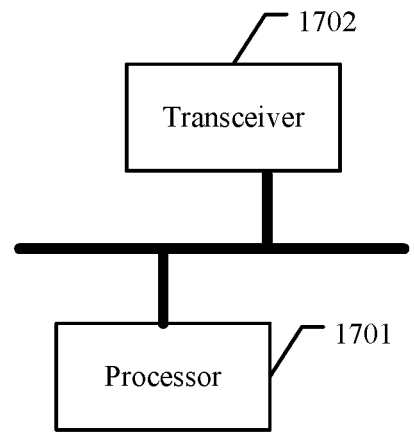
FIG. 17 is a schematic structural diagram of a communications apparatus according to an embodiment of this application.

FIG. 17 is a schematic structural diagram of a communications apparatus according to an embodiment of this application.

Referring to FIG. 17, the apparatus includes a processor 1701 and a transceiver 1702.

The processor 1701 is configured to generate a first message including a first identifier, where the first identifier is used to indicate a message type of the first message, and each message type corresponds to one control plane entity type; and the transceiver 1702 is configured to send the first message through an access network device.

Optionally, the first message further includes a second identifier, and the second identifier is used to indicate a network slice for which the first message is destined or a control plane entity for which the first message is destined.

Optionally, the transceiver 1702 is further configured to:
receive a second message that is sent by the access network device and that includes the first identifier; and
the processor 1701 is further configured to determine, based on the first identifier, a control plane entity type of the second message that is received by the terminal.

Optionally, the second message further includes a second identifier; and
the processor 1701 is further configured to:
send, based on the second identifier, the second message to a control plane entity that is of the terminal and that is in a network slice for which the second message is destined.

Figure 18:
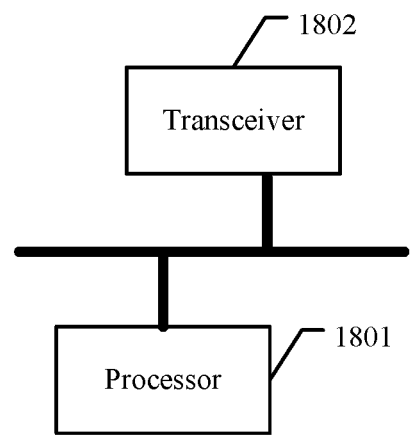
FIG. 18 is a schematic structural diagram of a communications apparatus according to an embodiment of this application.

FIG. 18 is a schematic structural diagram of a communications apparatus according to an embodiment of this application.

Referring to FIG. 18, the apparatus includes a processor 1801 and a transceiver 1802.

The transceiver 1802 is configured to receive a first message that is sent by a terminal and that includes a first identifier, where the first identifier is used to indicate a network slice for which the first message is destined; and
the processor 1801 is configured to send, based on the first identifier, the first message to the network slice for which the first message is destined.

Optionally, the first message further includes a second identifier, the second identifier is used to indicate a message type of the first message, and each message type corresponds to one control plane entity type.

Optionally, the processor 1801 is further configured to:
generate a second message, where the second message includes one or more of the first identifier and the second identifier; and
the transceiver 1802 is further configured to send the second message to the terminal.

Optionally, the first message is an RRC message in which a non-access stratum protocol data unit NAS PDU is encapsulated; and
the first identifier is in the RRC message, and the second identifier is in the NAS PDU.

Optionally, the first message is an RRC message in which a non-access stratum protocol data unit NAS PDU is encapsulated; and
both the first identifier and the second identifier are in the RRC message.

Figure 19:
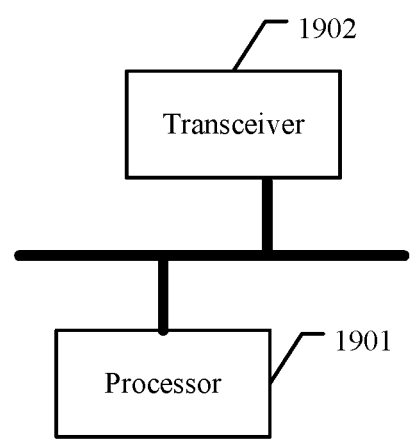
FIG. 19 is a schematic structural diagram of a communications apparatus according to an embodiment of this application.

FIG. 19 is a schematic structural diagram of a communications apparatus according to an embodiment of this application.

Referring to FIG. 19, the apparatus includes a processor 1901 and a transceiver 1902.

The processor 1901 is configured to generate a first message including a first identifier, where the first identifier is used to indicate a network slice for which the first message is destined; and
the transceiver 1902 is configured to send the first message to a network device.

Optionally, the first message further includes a second identifier, the second identifier is used to indicate a message type of the first message, and each message type corresponds to one control plane entity type.

Optionally, the transceiver 1902 is further configured to:
receive a second message sent by the network device, where the second message includes one or more of the first identifier and the second identifier.

Figure 20:
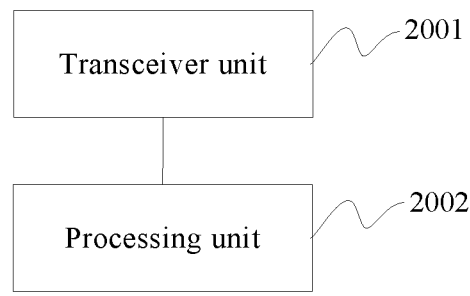
FIG. 20 is a schematic structural diagram of a communications apparatus according to an embodiment of this application.

FIG. 20 is a schematic structural diagram of a communications apparatus according to an embodiment of this application.

Referring to FIG. 20, the apparatus includes:
a transceiver unit 2001, configured to receive a first message that is sent by a terminal through an access network device and that includes a slice identifier, where the slice identifier is used to indicate a network slice for which the first message is destined; and
a processing unit 2002, configured to send, based on the slice identifier, the first message to the network slice for which the first message is destined.

Optionally, the processing unit 2002 is further configured to generate a second message, where the second message includes the slice identifier; and
the transceiver unit 2001 is further configured to send the second message to the terminal through the access network device.

Optionally, the first message is an RRC message in which a non-access stratum protocol data unit NAS PDU is encapsulated; and
the slice identifier is in the NAS PDU.

Optionally, the transceiver unit 2001 is further configured to:
receive a third message that is sent by a network slice and that includes a slice identifier, where the third message is a paging message; and
send the third message to the terminal through the access network device.

Figure 21:
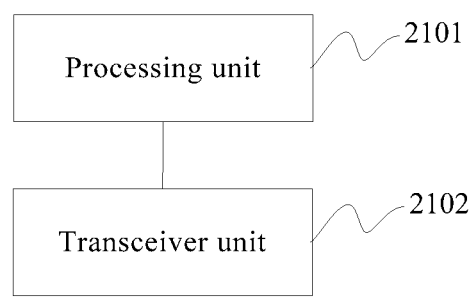
FIG. 21 is a schematic structural diagram of a communications apparatus according to an embodiment of this application.

FIG. 21 is a schematic structural diagram of a communications apparatus according to an embodiment of this application.

Referring to FIG. 21, the apparatus includes:
a processing unit 2101, configured to generate a first message including a slice identifier, where the slice identifier is used to indicate a network slice for which the first message is destined; and
a transceiver unit 2102, configured to send the first message to a core network device through an access network device.

Optionally, the transceiver unit 2102 is further configured to:
receive a second message that is sent by the core network device and that includes a slice identifier; and
send, based on the slice identifier, the second message to a network slice that is of the terminal and that corresponds to the slice identifier.

Optionally, the transceiver unit 2102 is further configured to:
receive a third message that is sent by the core network device and that includes a slice identifier, where the third message is a paging message; and
send, based on the slice identifier, the third message to a network slice that is of the terminal and that corresponds to the slice identifier.

In the embodiments of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU for short), a network processor (NP for short), or a combination of a CPU and an NP. The processor may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (FPGA for short), generic array logic (GAL for short), or any combination thereof.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations provided that they fall within the scope of protection defined by the following claims.

What is claimed is:

1. A communication method, comprising:
receiving, by a core network device, a message from a terminal device, wherein the message comprises a first identifier and a second identifier, the first identifier indicates a message type of the message, and the second identifier indicates a network slice the message is dedicated to;
determining, by the core network device and based on the first identifier, a control plane entity type corresponding to the message type;
determining, by the core network device and based on the second identifier, a control plane entity in the network slice that corresponds to the control plane entity type; and
sending, by the core network device, the message to the control plane entity.

2. The method according to claim 1, wherein the message is a non-access stratum protocol data unit (NAS PDU), and wherein the first identifier is comprised in the NAS PDU.

3. The method according to claim 1, wherein the second identifier is comprised in the NAS PDU.

4. A communications method, comprising:
generating, by a terminal device, a message comprising a first identifier and a second identifier, wherein the first identifier indicates a message type of the message, and wherein the message type of the message corresponds to a control plane entity type, the second identifier indicates a network slice the message is dedicated to and a control plane entity in the network slice that corresponds to the control plane entity type; and
sending, by the terminal device, the message to a core network device.

5. The method according to claim 4, wherein the message is a non-access stratum protocol data unit (NAS PDU), and wherein the first identifier is comprised in the NAS PDU.

6. The method according to claim 4, wherein the second identifier is comprised in the NAS PDU.

7. A core network device, comprising:
at least one processor; and
a non-transitory computer-readable storage medium coupled to the at least one processor and storing programming instructions for execution by the at least one processor, the programming instructions instruct the core network device to:
receive a message from a terminal device, wherein the message comprises a first identifier and a second identifier, the first identifier indicates a message type of the message, and the second identifier indicates a network slice the message is dedicated to;
determine, by the core network device and based on the first identifier, a control plane entity type corresponding to the message type;
determine, by the core network device and based on the second identifier, a control plane entity in the network slice that corresponds to the control plane entity type; and
send, based on the second identifier, the message to the control plane entity.

8. A terminal device, comprising:
at least one processor; and
a non-transitory computer-readable storage medium coupled to the at least one processor and storing programming instructions for execution by the at least one processor, the programming instructions instruct the terminal device to:
generate a message comprising a first identifier and a second identifier, wherein the first identifier indicates a message type of the message, and-wherein the message type of the message corresponds to a control plane entity type, the second identifier indicates a network slice the message is dedicated to and a control plane entity in the network slice that corresponds to the control plane entity type; and
send the message to a core network device.

* * * * *